US005592206A

United States Patent [19]

Watanabe et al.

[11] Patent Number: 5,592,206

[45] Date of Patent: Jan. 7, 1997

[54] WRITE HEAD FOR FLUORESCENT PRINTER

[75] Inventors: Hiroshi Watanabe; Masao Miyagishima; Toshimitsu Fuyuki, all of Mobara, Japan

[73] Assignee: Futaba Denshi Kogyo K.K., Mobara, Japan

[21] Appl. No.: 50,238

[22] PCT Filed: Sep. 11, 1992

[86] PCT No.: PCT/JP92/01168

§ 371 Date: Sep. 27, 1993

§ 102(e) Date: Sep. 27, 1993

[87] PCT Pub. No.: WO93/04867

PCT Pub. Date: Mar. 18, 1993

[30] Foreign Application Priority Data

Sep. 11, 1991 [JP] Japan .................................... 3-258732

[51] Int. Cl.$^6$ ............................... B41J 2/435; H04N 1/23

[52] U.S. Cl. .......................... 347/122; 347/237; 347/238; 313/494; 313/497

[58] Field of Search ......................... 346/107 R; 347/237, 347/238, 120, 121, 122; 313/494, 495, 496, 497

[56] References Cited

U.S. PATENT DOCUMENTS

| | | | |
|---|---|---|---|
| 4,536,778 | 8/1985 | De Schamphelaere et al. | 346/107 R X |
| 4,743,800 | 5/1988 | Miura et al. | 313/497 |
| 4,763,041 | 8/1988 | Segawa | 313/497 |
| 4,859,913 | 8/1989 | Genovese et al. | 315/169.4 |

FOREIGN PATENT DOCUMENTS

| | | |
|---|---|---|
| 59-75543 | 4/1984 | Japan . |
| 60-61273 | 4/1985 | Japan . |
| 60-200443 | 10/1985 | Japan . |
| 3-159039 | 7/1991 | Japan . |

*Primary Examiner*—Benjamin R. Fuller
*Assistant Examiner*—David Yockey
*Attorney, Agent, or Firm*—Oblon, Spivak, McClelland, Maier & Neustadt, P.C.

[57] ABSTRACT

A write head for a fluorescent printer which is capable of being prevented from being adversely affected by charging of electrons and opposite control electrodes and capable of forming an electrode pattern with high precision. Anodes 7 are arranged on a glass substrate 1 in a main scanning direction to constitute anode arrays in juxtaposition to each other, so that the anode arrays are arranged in two rows extending in a sub-scanning direction. The two anode arrays are so provided that the anodes 7 corresponding to each other in both anode arrays are arranged in a zigzag arrangement. Each pair of adjacent anodes 7 which correspond to each other in both anode arrays and are arranged so as to alternate in the zigzag arrangement include anode conductors 2 connected to each other through a wiring conductor 3*a*. The respective anode arrays are surrounded by groups of control electrodes 4*a* and 4*b* electrically independent from each other, respectively. Both groups of control electrodes 4*a* and 4*b* are arranged so as to be opposite to each other at an intermediate position between both anode arrays. The write head of the present invention is free of any insulating layer.

3 Claims, 2 Drawing Sheets

WRITE HEAD FOR FLUORESCENT PRINTER

BACKGROUND OF THE INVENTION

1. Field of the Invention

This invention relates to a write head for a fluorescent printer which is effectively used as a write head for an optical printer.

2. Discussion of Background

In general, an optical printer is so constructed that a recording medium such as a photosensitive drum charged is irradiated on a surface thereof with light in a dot-like manner to form a latent image of a letter, a figure or the like on the recording medium, which latent image is then developed and transferred onto a recording paper. As a write head for such an optical printer is conventionally known a write head for a fluorescent printer which utilizes a principle of a fluorescent display device, which is typically exemplified in, for example, Japanese Patent Application Laid-Open Publication No. 200443/1985.

In an optical write device disclosed in the Japanese publication, a plurality of dot-like anodes each comprising an anode conductor and a phosphor layer deposited thereon are provided on a substrate. Groups of dot-like anodes are arranged in a manner to be spaced from each other at a predetermined interval in a main scanning direction (which is a direction of rotation of a photosensitive drum), resulting in forming anode arrays. The anode arrays are juxtaposed in two rows in a sub-scanning direction (which is a direction of movement of the photosensitive drum or a direction perpendicular to the main scanning direction). The anodes of each of the anode arrays are arranged in a manner to be positioned at different positions or deviated from each other in the main scanning direction. More particularly, the anodes of each anode array which are adjacent to each other are arranged in a zigzag manner and each pair of the anodes are integrally connected to each other through a wiring conductor which is formed into the same width as each anode conductor.

The conventional optical write device also includes insulating layers arranged in three rays in the main scanning direction, which are formed by depositing insulating paste on an outer side of each of the anode arrays and between both anode arrays by thick film printing techniques. The insulating layers are provided thereon with control electrodes for the respective anode arrays. The control electrodes each are made of a mesh-like metal material. Also, the conventional optical write device includes filamentary cathodes arranged above the control electrodes.

Unfortunately, the conventional optical write device constructed as described above has some disadvantages.

In the optical write device, the insulating layers underlie the control electrodes, so that they each are charged on a surface thereof with electrons to form a negative electric field in proximity to the anodes, resulting in display defects occurring.

Another disadvantage of the conventional optical write device is that it fails to form a pattern of the insulating layers with high accuracy because they are formed into a large thickness, therefore, it is substantially impossible to provide the insulating layer in a space between the anode arrays which has a width as small as 1 mm or less.

A further disadvantage of the conventional optical write device is that it is highly difficult to provide two mesh-like control electrodes on a surface of the insulating layer between the anode arrays while keeping the control electrodes electrically non-conductive.

Actually, the above-described disadvantages of the conventional optical write device prevent it from being put to practical use.

Accordingly, it is an object of the present invention to provide a write head for a fluorescent printer which is capable of effectively prevented from being adversely affected by charging of electrons and an electric field generated by opposite control electrodes.

SUMMARY OF THE INVENTION

In accordance with the present invention, a write head for a fluorescent printer is provided which comprises arrays of dot-like anodes comprising anode conductors and phosphor layers and arranged on a substrate spaced from each other at a predetermined interval in a main scanning direction; said anode arrays being juxtaposed in two rows extending in a sub-scanning direction; said anodes which correspond to each other in both anode arrays being arranged at positions different from each other in said main scanning direction, resulting in a zigzag arrangement; and at least one control electrode arranged on said substrate. The write head thus constructed is characterized in that said anode conductors, wiring conductors and control electrode each are made of a thin film of metal, and said control electrode is arranged so as to extend to an intermediate position of said anode arrays.

In the present invention, the anode conductors, wiring conductors and control electrode each are made of a thin film of metal formed on the substrate, so that a necessity of providing, on the substrate, any insulating layer which causes electrons to be charged thereon may be eliminated. Also, the anode arrays are surrounded by the corresponding control electrodes or control electrode sections, resulting in being prevented from being adversely affected by the control electrodes or control electrode sections other than the corresponding control electrodes or control electrode sections.

DETAILED DESCRIPTION OF THE PREFERRED EMBODIMENTS

Now, the present invention will be more detailedly described with reference to the accompanying drawings.

Figure 1:
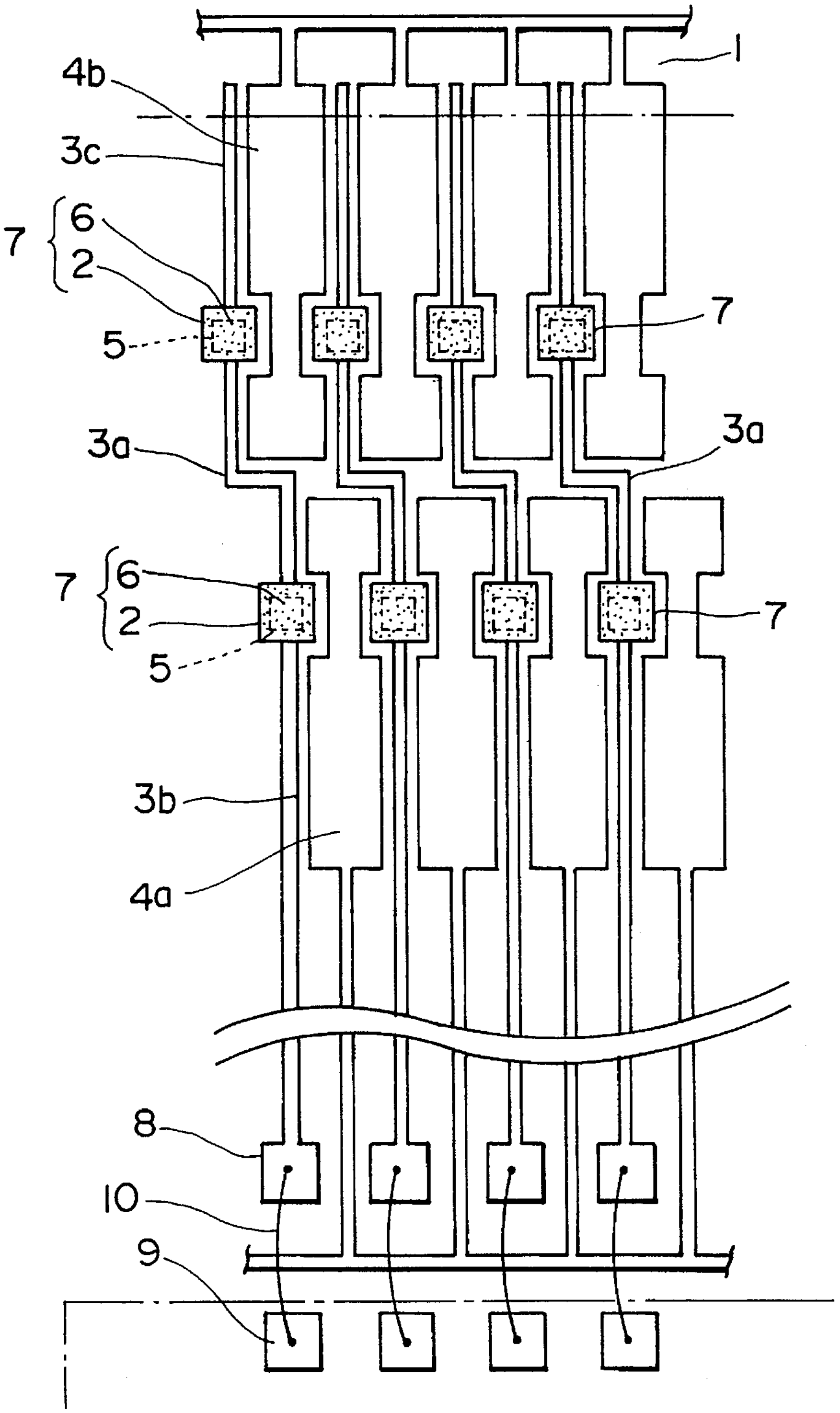
FIG. 1 is a fragmentary enlarged plan view showing a glass substrate in a first embodiment of a write head for a fluorescent printer according to the present invention.

FIG. 1 shows a first embodiment of a write head for a fluorescent printer according to the present invention, which is constructed so as to be of the dynamic drive type.

A write head of the illustrated embodiment includes a glass substrate 1, which has a thin film of Al deposited all over the substrate 1. Then, patterns of anode conductors 2, wiring conductors 3 and control electrodes 4 is formed on the same plane of the glass substrate by photolithography.

The anode conductors 2 each are formed with a square opening 5, resulting in being formed into a frame-like configuration. On each of the anode conductors 2 is deposited a phosphor layer 6 so as to cover both a frame portion and the opening 5 of the anode conductor 2, so that a plurality of anodes 7 are formed in a dot-like manner. The anodes 7 are arranged spaced from each other at a predetermined interval in a main scanning direction, to thereby provide anode arrays. More particularly, the anode arrays are arranged in two rows extending in a sub-scanning direction. The adjacent anode conductors 2 which correspond to each other in both anode arrays are positioned so as to be deviated from each other in the main scanning direction, resulting in a zigzag arrangement manner in the main scanning direction.

The write head of the illustrated embodiment is of the type wherein light emitted from the phosphor layers 6 is observed through the openings 5 of the anode conductors 2 and the glass substrate 1, and a configuration of the light is regulated by a pattern of the openings 5. For the reason, the phosphor layer 6 may be deposited in an area larger than a size of the opening 5 and smaller than that of the anode conductor 2. Thus, deposition of the phosphor layer on the anode conductor 2 may be carried out without increased dimensional accuracy, to thereby permit manufacturing of the write head to be simplified. A configuration of a luminous pattern depends on accuracy of photolithography, so that the luminous pattern may be formed with high accuracy to a degree sufficient to permit luminous dots to be identical with each other. Thus, a plurality of the dot-like anodes 7 can be formed so as to exhibit uniform luminous intensity.

Each pair of the anodes which correspond to each other in a zigzag arrangement in both anode arrays is connected to each other by means of a wiring conductor 3*a* formed into a stepwise bent pattern. Also, the anode conductors 2 of one of the anode arrays are connected through linear or straight wiring conductors 3*b* to square terminal sections 8, respectively. The terminal sections 8 are then connected to terminals 9 of driver ICs through bonding wires 10, respectively. The anode conductors 2 of the other anode array are connected to linear or straight short wiring conductors 3*c*, respectively, so that approximate electric field conditions may be created in proximity to the above-described one anode array.

The control electrodes A are depositedly formed on the glass substrate 1 planely in a manner similar to the anode conductors 2 described above and arranged for every anode array. One group of control electrodes 4*a* for the one anode array are arranged so that each adjacent two control electrodes 4*a* surround or interpose each anode 7 of the one anode array and each wiring conductors 3*a* and 3*b* therebetween with a gap of a predetermined distance being defined therebetween. The other group of control electrodes 4*b* for the other anode array are arranged so that each adjacent two control electrodes 4*b* surroundingly interpose each anode 7 of the other anode array and each wiring conductors 3*a* and 3*b* therebetween with a gap of a predetermined distance being defined therebetween.

In the illustrated embodiment, a distance between the control electrode 4 and the anode 7 and wiring conductor 3 is defined to be 50 μm or less. The conventional write head fails to provide a gap of such a micro-distance therebetween. On the contrary, the illustrated embodiment can effectively realize the micro-distance gap with high accuracy by photolithography because of employing a planar electrode structure made of a thin film.

Then, at least one filamentary cathode (not shown) is stretchedly arranged above the glass substrate 1 thus constructed. The glass substrate 1 constitutes a part of an envelope which is evacuated to a high vacuum and in which the above-described electrodes are received.

In the illustrated embodiment constructed as described above, a cathode potential is applied to the filamentary cathode, resulting in electrons being emitted therefrom. A grid voltage is selectively alternately applied to the control electrodes 4*a* and 4*b*. In synchronism with application of the grid voltage to the control electrodes, a display signal is selectively fed to the anodes 7 desired to emit light, to thereby permit the anodes to emit light. The control electrodes 4*a* or 4*b* to which the grid voltage is not applied are fed with a voltage of zero volt or a negative voltage to prevent electrons emitted from the cathode from impinging on the anodes 7 which are not desired to emit light.

Thus, the illustrated embodiment eliminates such adverse affection by an electric field generated due to charging of electrons as described above in connection with the prior art because it employs a planar electrode structure free of any three-dimensional insulating layer.

Also, the control electrodes 4 each are arranged so as to surround each of the anode arrays, to thereby prevent an electric field generated by one of the anode arrays and the like from adversely affecting the other anode array.

Thus, the write head of the illustrated embodiment substantially prevents phenomena such as leakage luminance, display defects and the like.

In the embodiment described above, the anode conductors 2 each are provided with the opening 5, to form frame-like or hollow shape. Alternatively, the embodiment may be constructed in such a manner that the anode conductor is formed into a predetermined solid shape free of any opening and the phosphor layers are deposited on the anode conductor. In this instance, light emitted from the phosphor layers is observed through a front cover arranged opposite to the glass substrate.

Now, a second embodiment of a write head for a fluorescent printer according to the present invention will be described hereinafter with reference to FIG. 2.

Figure 2:
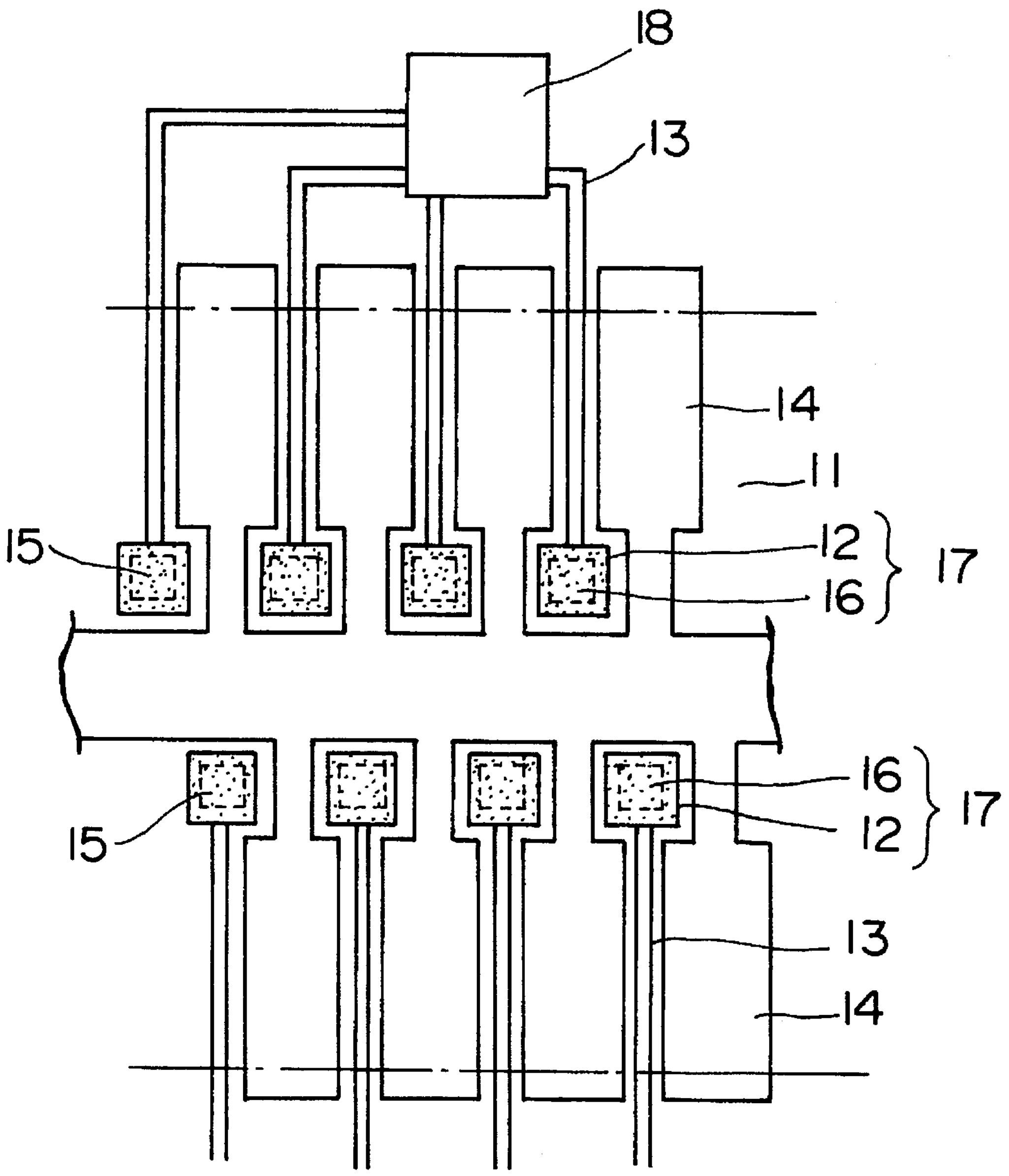
FIG. 2 is a fragmentary enlarged plan view showing a glass substrate in a second embodiment of a write head for a fluorescent printer according to the present invention.

A write head of the embodiment shown in FIG. 2 is of the static driving type.

FIG. 2 is a plan view showing an essential part of an anode substrate. The write head of the illustrated embodiment includes a glass substrate 11 which has a thin film of Al deposited all over the substrate 11 by sputtering. Then, the thin Al film is subject to photolithography. This results in anode conductors 12, wiring conductors 13 and a control electrode 14 being formed in predetermined patterns on the same plane in such a manner that the anode conductors 12 are Juxtaposed to each other in a zigzag manner, the wiring conductors 13 outwardly extend from the glass substrate 11, and the control electrode 14 continuously surrounds the anode conductors 12. The anode conductors 12 each have a phosphor layer 16 deposited thereon, to thereby constitute dot-like anodes 17.

The write head of the illustrated embodiment is of the front emission type wherein light emitted from the phosphor layers is irradiated on a photosensitive drum. The anode conductors 12 each are provided with an opening 15, resulting in being formed into a frame-like shape as in the first embodiment described above. However, when the write head is of the type wherein light is irradiated through a front glass, the anode conductors each may be formed into a suitable solid shape free of such an opening such as a square shape, a rectangular shape, a circular shape or the like.

In the second embodiment, the anode arrays are provided in such a manner that anodes corresponding to each other in the anode arrays are arranged in a zigzag manner as in the first embodiment. Also, the wiring conductors 13 are connected to the anode conductors 12, respectively, because of the static drive type.

The control electrode 14, as shown in FIG. 2, is continuously formed in a predetermined pattern so as to continuously surround the anode conductors 12 and wiring conductors 13. The control electrode 14 is constantly applied thereto a positive voltage.

The wiring conductors 13 each are connected at one end thereof to an anode driver IC 18 provided on the substrate 11. Also, the anodes each are fed with a display signal.

The write head also includes at least one filamentary cathode arranged above the glass substrate 11 constructed as described above. The number of filamentary cathodes may be one or more. Then, a front casing is arranged on the glass substrate 11 to form a box-like envelope, which is then evacuated to a high vacuum.

In the write head of the second embodiment constructed as described above, a cathode voltage is applied to the filamentary cathode to cause it to discharge electrons and a positive grid voltage is constantly applied to the control electrode. The anodes to be selected are applied thereto a positive anode voltage to cause them to emit light. Also, the anodes which are not desired to emit light are applied thereto a negative cutoff voltage to generate a negative electric field, to thereby prevent the electrons from impinging on the anodes. In this instance, a positive electric field generated from the control electrode having a positive voltage applied thereto is around the negative electric field thus generated, so that the negative electric fields generated from the adjacent anodes are neutralized, to thereby be prevented from affecting the anodes emitting light.

Thus, the second embodiment effectively prevents a negative electric field of the adjacent anodes which are not selected from adversely affecting the anodes selected. Therefore, the write head of the illustrated embodiment minimizes or substantially prevents occurrence of display defects.

As can be seen from the foregoing, in the write head of the present invention, two anode arrays are so provided that anodes corresponding to each other in both anode arrays are arranged in a zigzag manner, wherein the anode conductors, wiring conductors and control electrode(s) are made of a thin metal film and the control electrode(s) is arranged so as to extend to an intermediate position of the anode arrays. Such construction permits the write head of the present invention to exhibit the following advantages:

(1) The above-described construction eliminate a necessity of providing any insulating layer in proximity to the anodes to prevent charging of electrons, so that the present invention effectively eliminates disadvantages leakage luminance and display defects due to the electrons charged, and the like.

(2) The electrodes and wirings are made of a thin metal film by photolithography, so that electrode patterns and wiring patterns may be formed with high accuracy, to thereby provide luminance with high definition.

(3) The anode arrays each are arranged so as to be surrounded by the control electrode(s), to thereby prevent one of the anode arrays from being adversely affected by an electric field of the control electrode(s) for the other anode array.

We claim:

1. A write head for a fluorescent printer comprising:

arrays of dot-like anodes including anode conductors and phosphor layers arranged on a substrate spaced from each other at a predetermined interval in a main scanning direction;

said anode arrays being juxtaposed in two rows extending in a sub-scanning direction, wherein each of said anode conductors of one of said rows corresponds to one of said anode conductors of another of said rows;

anodes of each of said arrays which correspond to each other being connected by one of a plurality of wiring conductors, resulting in a zigzag arrangement; and said corresponding anodes being arranged offset from each other;

a plurality of control electrodes for each of said anode arrays arranged on said substrate;

wherein said anode conductors, wiring conductors, and control electrodes are all coplaner and are each made of a thin metal film; and said control electrodes are formed of two electrically separate groups of electrodes, each of said groups extended to an intermediate portion of said arrays and surrounded by each of said anode conductors and wiring conductors of one of said anode arrays.

2. A write head as defined in claim 1, characterized in that said substrate is light-permeable;

said anode conductors each are provided with an opening in said anode conductors, to form a frame-like shape; and wherein light is emitted from each of said phosphor layers and passes through each said opening in said anode conductors.

3. A write head as defined in claim 1, characterized in that said wiring conductors are each formed into a width smaller than a width of one of said anode conductors;

each of said control electrodes is independent from others of said control electrodes.

* * * * *